US012041395B2

(12) United States Patent
Kim

(10) Patent No.: US 12,041,395 B2
(45) Date of Patent: Jul. 16, 2024

(54) BLINKLESS AND MARKERLESS BI-PHASE DISPLAY CALIBRATION

(71) Applicant: Microsoft Technology Licensing, LLC, Redmond, WA (US)

(72) Inventor: Taemin Kim, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 71 days.

(21) Appl. No.: 17/964,775

(22) Filed: Oct. 12, 2022

(65) Prior Publication Data

US 2024/0129445 A1    Apr. 18, 2024

(51) Int. Cl.
| H04N 9/31 | (2006.01) |
| G02B 26/08 | (2006.01) |
| G02B 26/10 | (2006.01) |
| G02B 27/01 | (2006.01) |

(52) U.S. Cl.
CPC ....... H04N 9/3191 (2013.01); G02B 26/0833 (2013.01); G02B 26/105 (2013.01); G02B 27/0172 (2013.01); H04N 9/3152 (2013.01)

(58) Field of Classification Search
CPC ...... H04N 9/31; H04N 9/3191; H04N 9/3152; G02B 26/0833; G02B 26/105; G02B 27/0172
USPC .................................................. 348/745, 756
See application file for complete search history.

(56) References Cited

U.S. PATENT DOCUMENTS

| 7,566,855 | B2* | 7/2009 | Olsen | H01L 27/14621 |
| | | | | 250/208.1 |
| 7,772,532 | B2* | 8/2010 | Olsen | H01L 27/14634 |
| | | | | 396/103 |
| 8,331,005 | B2* | 12/2012 | Burinskiy | G09G 3/02 |
| | | | | 359/199.1 |
| 8,371,698 | B2* | 2/2013 | Brown | G09G 3/02 |
| | | | | 345/204 |
| 8,803,926 | B2* | 8/2014 | Kobayashi | G09G 5/18 |
| | | | | 345/204 |
| 9,438,871 | B2* | 9/2016 | Ide | H04N 9/317 |
| 10,120,185 | B2* | 11/2018 | Kimura | H04N 9/3185 |
| 11,307,403 | B2* | 4/2022 | Druml | G02B 26/101 |

(Continued)

FOREIGN PATENT DOCUMENTS

JP    2019000583 A    1/2019

OTHER PUBLICATIONS

International Search Report and Written Opinion received for PCT Application No. PCT/US23/031481, Dec. 1, 2023, 13 pages.

*Primary Examiner* — Trang U Tran
(74) *Attorney, Agent, or Firm* — Workman Nydegger

(57) ABSTRACT

Techniques for separating an image into a forward sweeping image and a backward sweeping image are disclosed. A lookup table maps MEMS projection positions on a display with corresponding pixel positions in an image generated by a camera facing the display. The lookup table is used to associate a first set of pixel positions in the image with a forward scanning sweep of the MEMS system. The lookup table is also used to associate a second set of pixel positions in the image with a backward scanning sweep of the MEMS system. The first and second sets of pixel positions are used to generate the forward sweeping image and the backward sweeping image, respectively. These images can then be used to calibrate the MEMS system to compensate for bi-phase.

20 Claims, 17 Drawing Sheets

(56) References Cited

U.S. PATENT DOCUMENTS

| | | | |
|---|---|---|---|
| 11,743,434 B2 * | 8/2023 | Samples | ............ G02B 26/0833 |
| | | | 348/759 |
| 2002/0158814 A1 | 10/2002 | Bright | |
| 2018/0172984 A1 * | 6/2018 | Kimura | ................ H04N 9/3185 |
| 2019/0235229 A1 * | 8/2019 | Ujiie | ...................... G03B 21/28 |
| 2020/0284883 A1 * | 9/2020 | Ferreira | ................ G01S 7/4816 |
| 2021/0392310 A1 | 12/2021 | Samples | |

\* cited by examiner

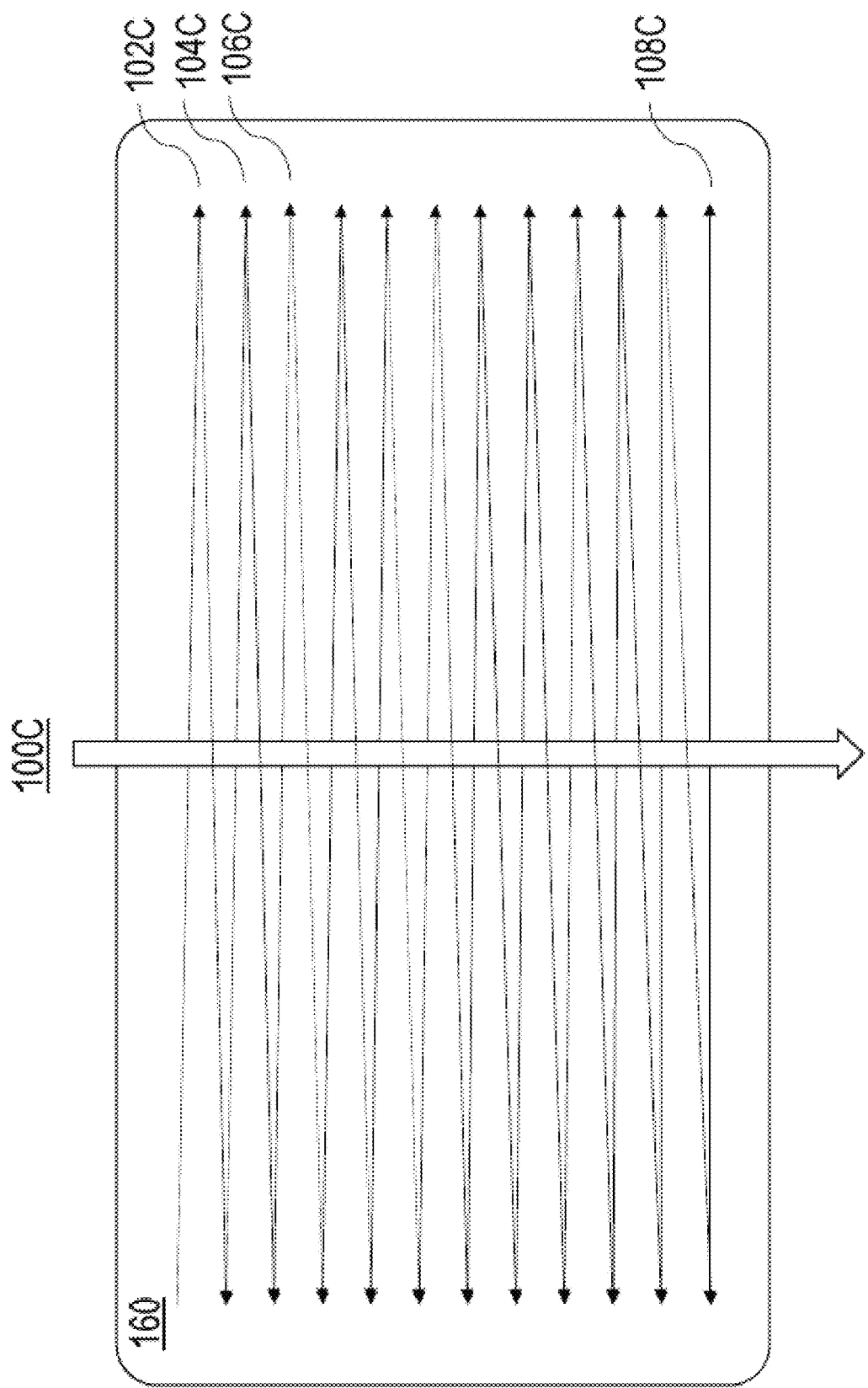

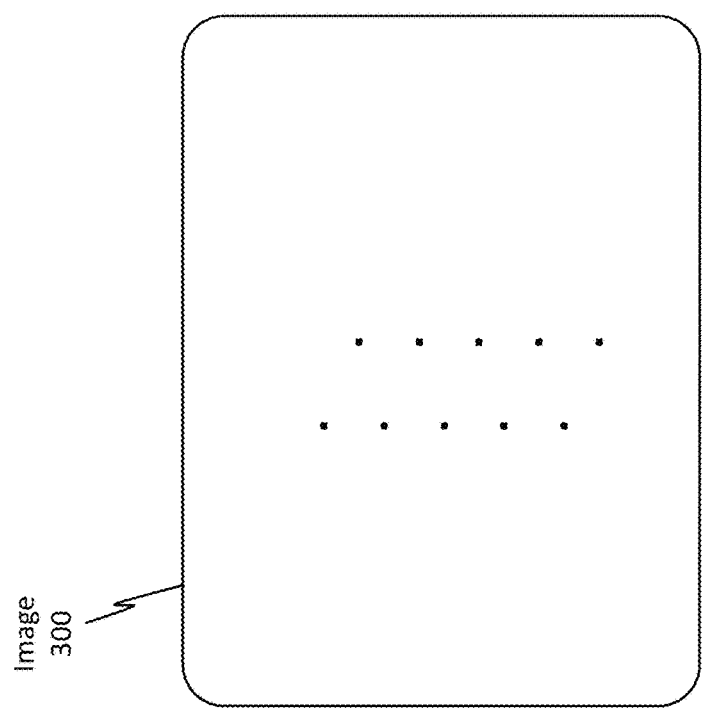

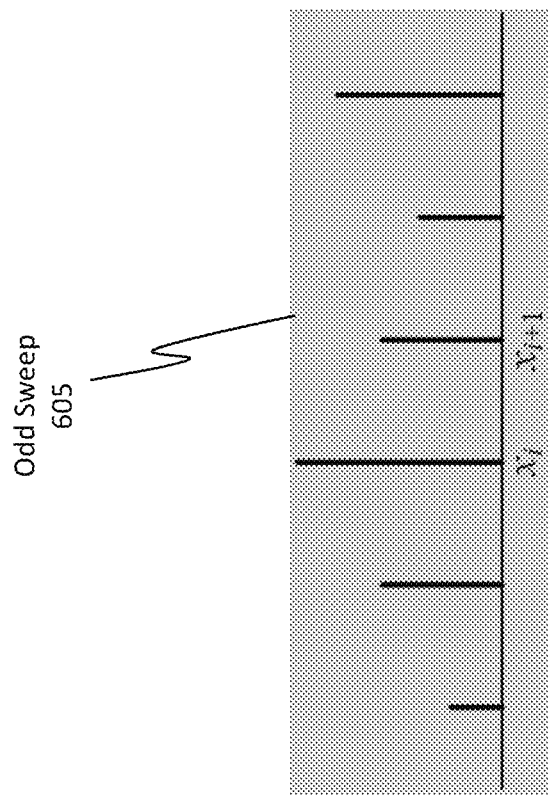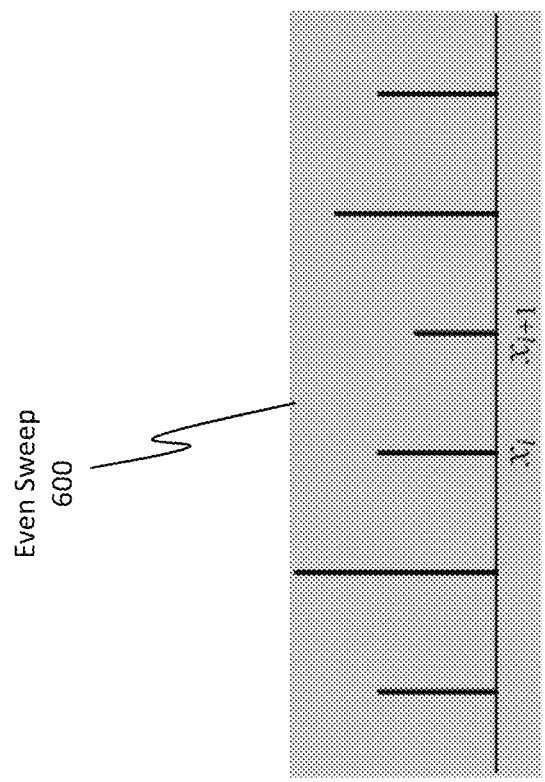
Figure 6

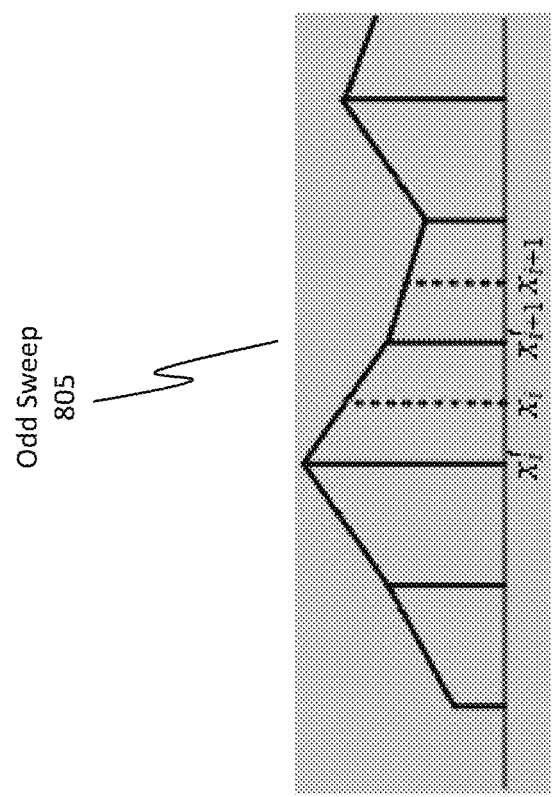
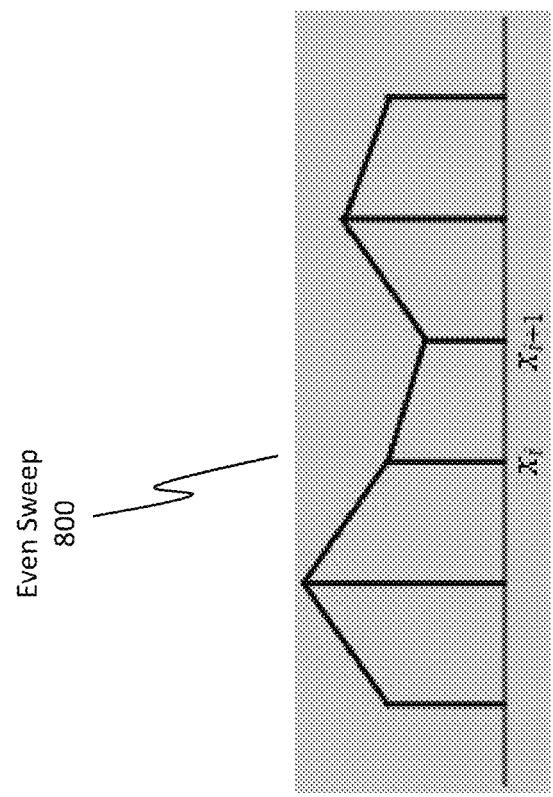
*Figure 8*

BLINKLESS AND MARKERLESS BI-PHASE DISPLAY CALIBRATION

BACKGROUND

Micro-electromechanical systems (MEMS) are miniaturized mechanical and electro-mechanical elements that are often made using the techniques of microfabrication. The physical dimensions of a MEMS device can vary from well below one micron to several millimeters.

One type of application of MEMS is related to optical switches and micro-mirrors to redirect or modulate light beams, particularly for mixed-reality (MR) systems (e.g., systems that can include augmented reality or virtual reality). A micro-mirror can be accurately controlled by a MEMS element to swing back and forth at a given frequency. One or more laser beams (e.g., red, green, and blue beams) at different intensities can be combined into a single beam, and the single beam can be relayed onto various MEMS scanning mirrors. The MEMS scanning mirrors then swing back and forth, scanning the beam in a raster pattern to project an image on a display of the MR system. The raster-scanned laser beam produces the impression of a steady image using a single scanning point as long as the scanning rate is fast enough. These images can produce the impression of motion. Such projected images or motion pictures can be created by modulating the lasers and the position of the scanned laser beam synchronously.

Each MEMS device can have a unique set of temperature characteristics, such that each MEMS device might behave slightly differently even when operating at the same temperature. For example, a MEMS scanning device can include one or more MEMS scanning mirrors, each of which might have its own temperature characteristic that can cause the projected image to deform or be out of specification at high or low temperatures. Furthermore, over the lifetime of the MEMS scanning device, certain temperature characteristics can change gradually to cause the performance of the MEMS device to worsen as time goes on.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., wearable head-mounted mixed-reality (MR) devices, hardware storage devices, etc.), and methods for separating an image into a forward sweeping image and a backward sweeping image. This image is taken by a camera that is facing a display on which a micro-electromechanical scanning (MEMS) system is projecting rendered content. The forward and backward sweeping images can be used to calibrated the MEMS system, such as to compensate for bi-phase offsets that may occur from usage over time or temperature influences.

Some embodiments access a lookup table. This lookup table maps (i) MEMS projection positions on the display (where the MEMS projection positions correspond to positions on the display where the MEMS system projects content) with (ii) corresponding pixel positions in an image generated by a camera facing the display. The embodiments access the image, which was generated by the camera. The lookup table is then used to associate a first set of pixel positions in the image with a forward scanning sweep of the MEMS system. The lookup table is also used to associate a second set of pixel positions in the image with a backward scanning sweep of the MEMS system. The embodiments use the first set of pixel positions to generate the forward sweeping image. The process of generating the forward sweeping image is performed by extracting first pixel content from the image at each pixel position in the first set of pixel positions and including that extracted first pixel content in the forward sweeping image. Similarly, the embodiments use the second set of pixel positions to generate the backward sweeping image. The process of generating the backward sweeping image is performed by extracting second pixel content from the image at each pixel position in the second set of pixel positions and including that extracted second pixel content in the backward sweeping image.

Optionally, some embodiments perform a vertical alignment operation to vertically align the backward sweeping image with the forward sweeping image. The embodiments can also perform a horizontal alignment operation to horizontally align the backward sweeping image with the forward sweeping image. Based on an offset that is determined as a result of performing the horizontal alignment operation, the embodiments can then calibrate the MEMS system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 1A, 1B, 1C, and 1D illustrate aspects related to a MEMS scanning device.

FIG. 3 also describes displaying lines to determine bi-phase.

FIG. 6 illustrates an even sweep (i.e., a forward sweep) and an odd sweep (i.e., a backward sweep) of the MEMS scanning system.

FIG. 8 illustrates various different charts of functions.

DETAILED DESCRIPTION

Figure 1A:
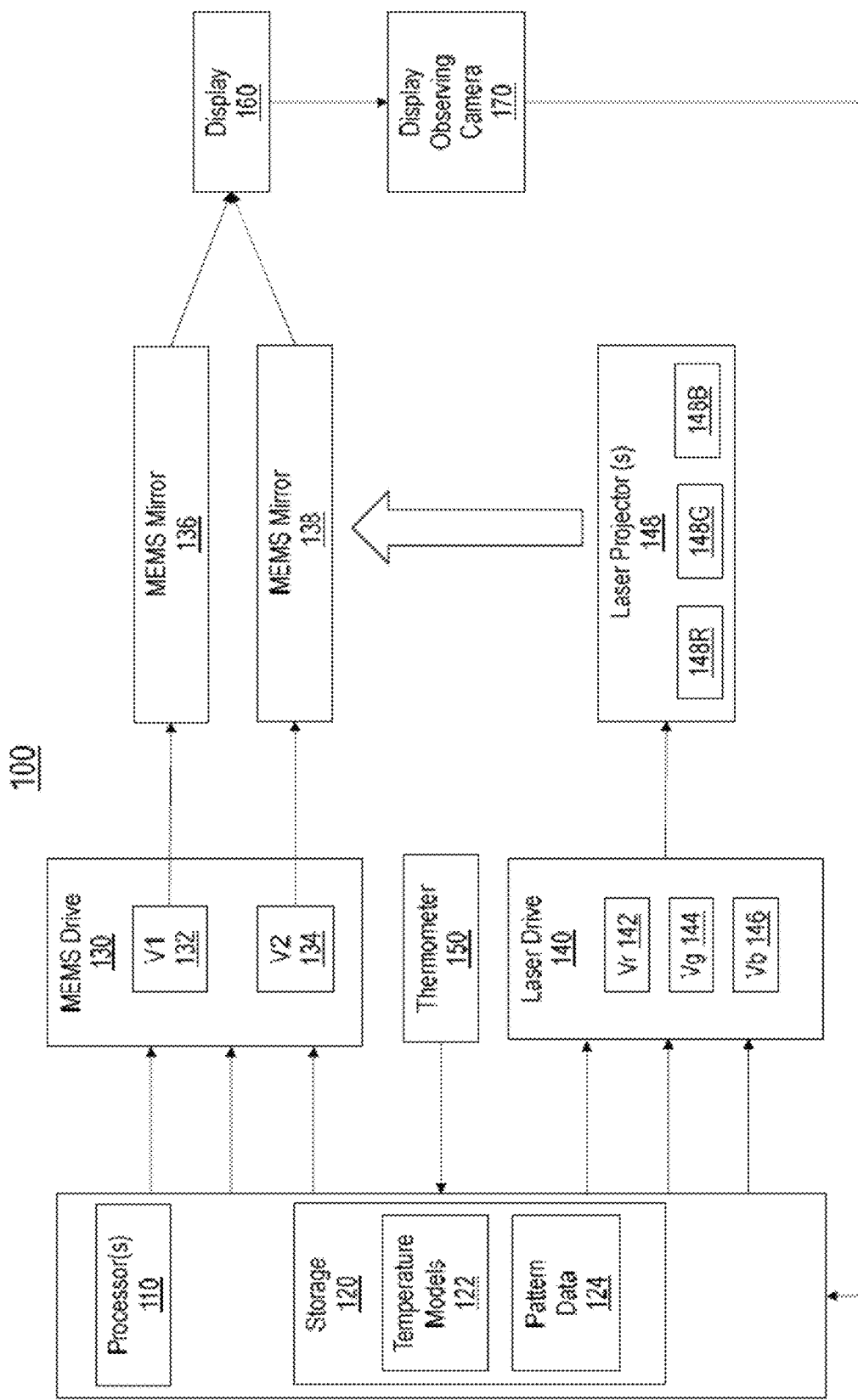

Embodiments disclosed herein relate to techniques for separating an image into a forward sweeping image and a backward sweeping image. The original image is taken by a camera that is facing a display on which a MEMS system is projecting rendered content. The forward and backward sweeping images are then used to facilitate a calibration of the MEMS system.

Some embodiments access a lookup table that maps MEMS projection positions on the display with corresponding pixel positions in an image generated by a camera facing the display. The lookup table associates a first set of pixel positions in the image with a forward scanning sweep of the MEMS system and associates a second set of pixel positions in the image with a backward scanning sweep of the MEMS system. The first and second sets of pixel positions are used to generate the forward sweeping image and the backward sweeping image, respectively.

Some embodiments vertically align the backward sweeping image with the forward sweeping image. These embodiments also horizontally align the backward sweeping image with the forward sweeping image. Based on an offset (e.g., a bi-phase offset) that is determined as a result of performing the horizontal alignment, the embodiments calibrate the MEMS system.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments beneficially provide a blinkless and markerless technique for MR system bi-phase display calibration. Use of this technique allows the MR system to continuously render time-critical content in the full field of view for the MR system's bi-phase display. Traditional calibration techniques required the use of blank out regions with fiducial patterns for online bi-phase and geometric calibration of the MR system's display. Blanking out the screen proved to be quite bothersome for the user experience. Continuous rendering of time-critical content on the display is highly desirable for real-time applications. The disclosed blinkless and markerless bi-phase display calibration techniques are able to reliably compute the bi-phase correction values while the display renders the time-critical content in its full field of view.

As indicated above, conventional approaches to the bi-phase display calibration required a blank out region having a fiducial pattern. Such traditional techniques caused inevitable drawbacks for the user's experience. For instance, a blank out region not only reduces the field of view in the display, but the traditional calibration technique also required a periodic blinking that often caused discomfort for users. These traditional limitations often caused users to miss information at various critical moments. They also resulted in visual fatigue.

The disclosed embodiments beneficially solve these problems by providing a blinkless and markerless bi-phase calibration solution. By following the disclosed principles, a user's experience will be significantly improved. Further, the visual display of information will also be improved in that it will no longer be periodically impaired when the calibration event is triggered.

The embodiments also provide power savings because fewer images are generated by a camera as compared to traditional techniques, as will be discussed in more detail later. Additional power savings are realized because the embodiments also reduce the computing time and proximity access to memory. Accordingly, these and numerous other benefits will now be described in more detail throughout the remaining portions of this disclosure.

MEMS Device

Having just described some of the various benefits, Attention will now be directed to FIG. 1A, which illustrates an example architecture of a MEMS scanning device 100 (hereinafter also referred to as "the device"). The device 100 also includes one or more laser projectors 148, one or more MEMS scanning mirrors 136 and/or 138, a display 160, and a thermometer 150.

The laser projectors 148 are controlled by a laser drive 140 to project a laser beam onto the MEMS scanning mirrors 136 and/or 138. In some embodiments, only one laser projector is implemented to project grayscale image(s). In some embodiments, the laser projectors 148 include multiple laser projectors, each of which projects a different colored laser beam. The multiple colored laser beams are merged into a single colored beam for projecting a color image. In some cases, an infrared (IR) laser can also be used to project IR light to the MEMS mirrors 136/138.

The laser projectors 148 include a red laser projector 148R, a green laser projector 148G, and a blue laser projector 148B. The red laser projector 148R projects a red laser beam, the green laser projector 148G projects a green laser beam, and the blue laser projector 148B projects a blue laser beam. The laser drive 140 uses three different control signals or parameters Vr 142, Vg 144, and Vb 146 to control an intensity (i.e., brightness) of each of the laser projectors 148R, 148G, and 148B at different times. The three different colored laser beams, each of which is projected at a specific intensity, are joined into a single laser beam to produce a desired color. For example, if each of the red, green, and blue projectors 148R, 148G, and 148B has 256 intensity levels, a total of 16,777,216 (=256×256×256) colors can be produced.

The single laser beam is projected onto the MEMS scanning mirrors 136 and/or 138. The MEMS scanning mirror(s) 136 and/or 138 are controlled by a MEMS drive 130. The MEMS drive 130 causes each of the MEMS mirrors 136 or 138 to deflect back and forth at an amplitude and a frequency. The amplitude and the frequency of each MEMS mirror 136 or 138 can be controlled by control signals or parameters V1 132 and V2 134. The deflection of the MEMS mirrors 136 and/or 138 causes the single laser beam to project a raster scan on the display 160.

In some embodiments, each of the MEMS mirrors 136 and 138 is a single-dimensional scanning mirror, which scans in a single dimension. The MEMS mirror 136 is configured to scan in a first dimension (e.g., horizontal), and the MEMS mirror 138 is configured to scan in a second dimension (e.g., vertical). The first dimension intersects (e.g., is orthogonal to) the second dimension. The single laser beam is first projected onto one of the MEMS mirrors 136 or 138. From the one MEMS mirrors 136 or 138, the laser beam is then reflected onto the other MEMS mirror 138 or 136. From the other MEMS mirror 138 or 136, the laser beam is then reflected onto the display 160 to generate a two-dimensional raster scan.

Figure 1B:
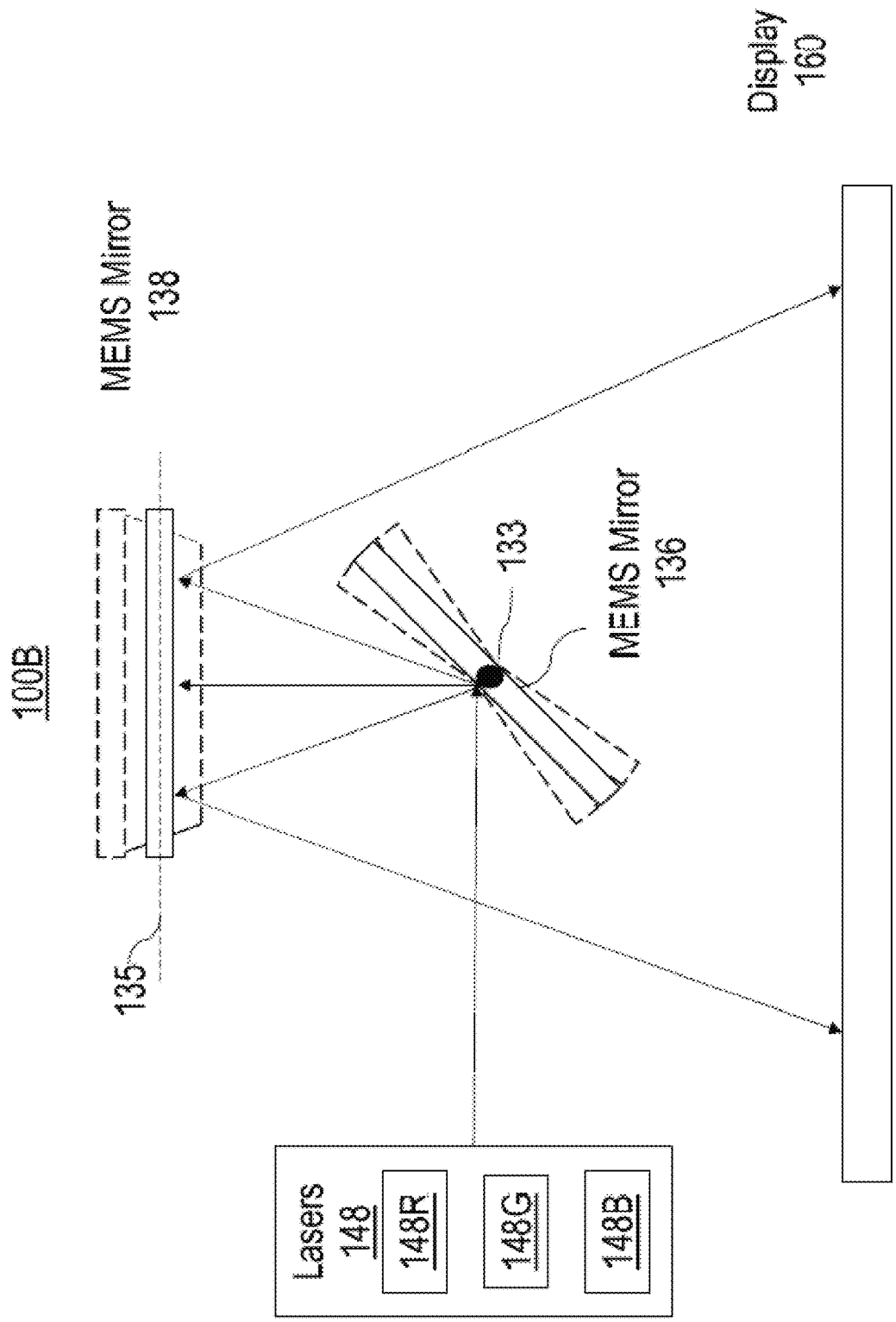

FIG. 1B further illustrates an example MEMS scanning device 100B that includes two single-dimensional scanning mirrors 136 and 138. These mirrors are structured to project a raster scan onto a display 160 (shown in FIG. 1A).

As illustrated in FIG. 1B, the laser projector 148 first projects a single beam onto the MEMS mirror 136. The MEMS mirror 136 deflects about an axis 133 to scan a single-dimensional line. The single-dimensional line is reflected from the MEMS mirror 136 onto the MEMS mirror 138, which deflects about an axis 135. The axis 133 and the axis 135 are orthogonal to each other, such that the single-dimensional line received by the MEMS mirror 138 is scanned into a two-dimensional raster scan image, which is finally projected onto the display 160.

FIG. 1C illustrates an example sequence of a raster scan 100C. As illustrated in FIG. 1C, a first cycle 102C is first drawn at the top of the display 160 by a first mirror (e.g., the first mirror 136 of FIG. 1B) scanning back and forth in a first dimension. At the same time, a second mirror (e.g., the second mirror 138 of FIG. 1B) deflects gradually to cause the lines scanned by the first mirror to gradually shift in a second dimension. Similarly, a second cycle 104C and a third cycle 106C are continuously drawn by the first mirror below the first cycle 102C and the gradually deflecting second mirror, and so on and so forth, until the last cycle or line 108C is drawn on the display. Then, the second mirror deflects all the way back to the starting position of the cycle 102C to restart drawing a next frame of image. As illustrated in FIG. 1C, the first mirror scans (horizontally) at a much faster frequency than the second mirror (that scans vertically), because after the first mirror has scanned all the cycles 102C-108C, the second mirror just finishes a first cycle. As such, the first mirror is also called a fast-scanning mirror, and the second mirror is also called a slow-scanning mirror.

With regard to FIG. 1C, when the MEMS system scans from the left side to the right side, this sweeping operation is a forward sweep of the MEMS system. When the MEMS scans from the right side to the left side, this sweeping operation is a backward sweep of the MEMS system.

A MEMS mirror often has a resonate frequency, which is determined by its mass, structure, and spring constant. In some embodiments, the fast mirror's deflection frequency is controlled to be close to the mirror's resonate frequency to obtain a large mirror deflection angle with a small current.

Figure 1D:
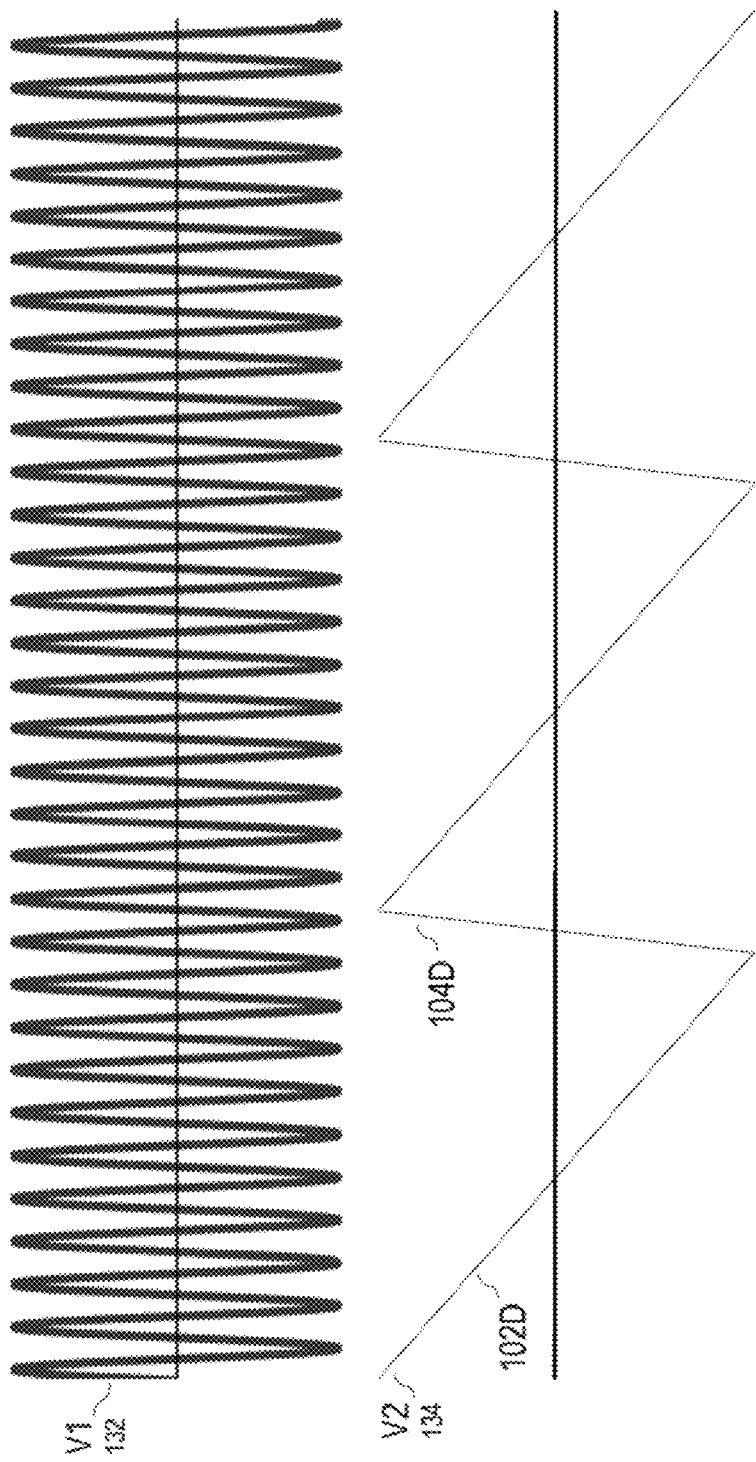

FIG. 1D illustrates an example control signal V1 132 of a fast-scanning mirror and an example control signal V2 134 of a slow-scanning mirror. As illustrated in FIG. 1D, the fast-scanning mirror can be controlled by a substantially sinusoidal signal at a first frequency, and the slow-scanning mirror can be controlled by a substantially sawtooth signal at a second frequency. The first frequency is much faster than the second frequency. Also, in some embodiments, the fast-scanning mirror can be a two-phase scanning mirror that scans back and forth bi-dimensionally to project a line, such that an image is drawn by lines projected in both directions. The slow-scanning mirror is often a single-phase scanning mirror that scans only in one direction, as such, the laser beam is projected only during the first edge 102D of the sawtooth signal 134. During the second edge 104D of the sawtooth signal 134, the laser projectors 148 can be turned off, so that no laser beam is projected onto the display 160. A single display frame is generated when the MEMS system completes a set of scanning operations (e.g., shown at the bottom right side of FIG. 1C). That is, the single display frame is complete when the MEMS mirrors reset and return to pointing at the top left most side of FIG. 1C.

In some embodiments, the two-dimensional raster scan can also be achieved by a single two-dimensional scanning mirror. A two-dimensional scanning mirror scans in two dimensions (i.e., a first dimension and a second dimension). The first dimension intersects or is orthogonal to the second dimension. The MEMS drive 130 can use a first control signal or parameter V1 132 to control the mirror's deflection in the first dimension, and use a second control signal V2 134 to control the mirror's deflection in the second dimension. In such a case, the single laser beam is projected onto the single two-dimensional scanning MEMS mirror, and the single MEMS mirror itself is capable of reflecting the laser beam onto the display 160 to generate a two-dimensional raster scan. The principles described herein are applicable to embodiments that implement two single-dimensional mirrors and/or embodiments that implement a single two-dimensional mirror.

It is desirable that the laser projectors 148 and the MEMS mirror(s) 136 and/or 138 are substantially synchronized at all times to project a clear image of a raster scan. In other words, each of the control parameter(s) V1 132, V2 134, Vr 142, Vg 144, Vb 146 should be substantially synchronized at all times. However, since each MEMS mirror 136 or 138 and/or certain other component(s) of the device 100 might have various unique temperature characteristics, when temperature changes, the MEMS mirror 136 or 138 and/or the other component(s) might behave slightly differently. Such differences can cause the raster scan to be deformed or can cause the laser projectors 148 and the MEMS mirror(s) 136 and/or 138 to be out of sync. Such deformations are a result of a bi-phase difference/offset that exists between the forward and backward sweeps of the MEMS system.

Referring back to FIG. 1A, the device 100 also includes a thermometer 150. The thermometer 150 is configured to detect a current temperature of the device 100. The thermometer 150 may be installed next to the MEMS scanning mirrors 136 or 138 or be installed anywhere in a housing of the device 100. In some embodiments, a separate thermometer 150 may be implemented for each MEMS scanning mirror 136 or 138 to be able to obtain a current temperature of the corresponding MEMS scanning mirror 136 or 138 more accurately.

As illustrated in FIG. 1A, in some embodiments, the device 100 also includes a display observing camera 170 that is configured to capture image(s) of a predetermined area of the display 160. In some cases, the predetermined area that is captured by the display observing camera 170 is smaller than the entire field of view of the display 160.

The display observing camera 170 captures one or more image(s) of whatever content is displayed on the display 160. Notably, the embodiments can operate without having to blank out the display 160 and can operate without having to display a predetermined pattern. Instead, the display observing camera 170 captures an image of whatever content is currently being displayed during the normal course of operation of the system. As will be described in more detail later, the embodiments are able to determine a level of bi-phase offset that exists. In response to identifying this bi-phase offset, the processor 110 of the device 100 may cause the MEMS drive 130 and/or the laser drive 140 to adjust the control parameter(s) V1 132, V2 134, Vr 142, Vg 144, and/or Vb 146 to mitigate the discrepancies during a calibration event.

Figure 2A:
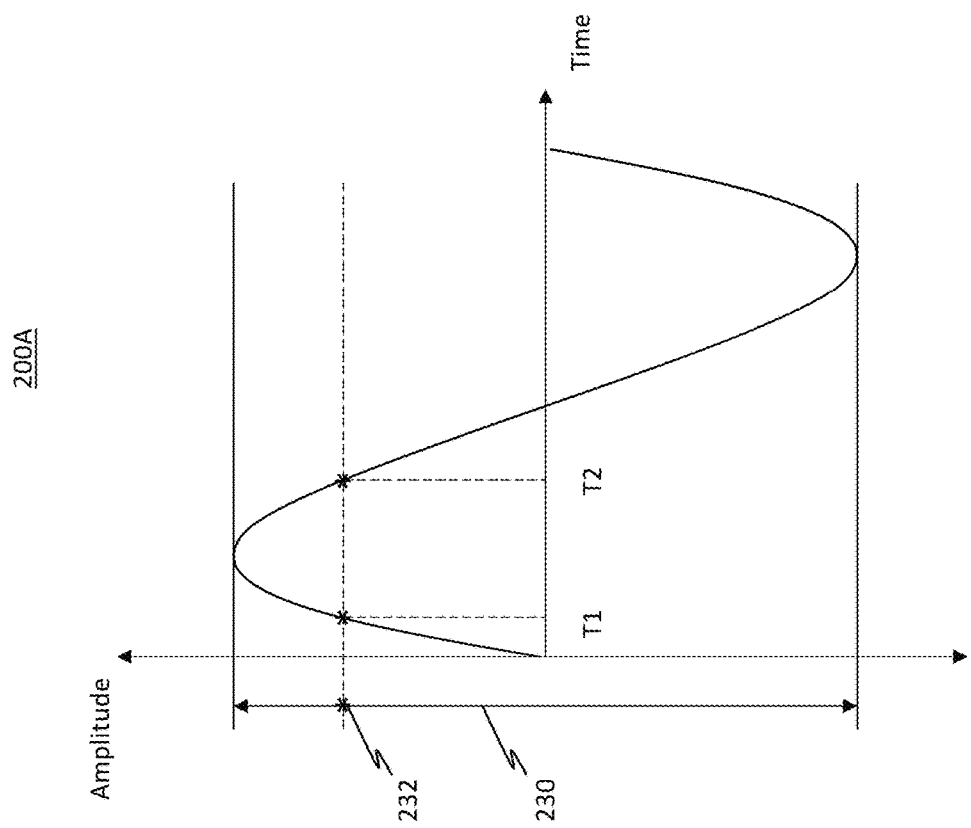
FIGS. 2A and 2B describe various scenarios related to bi-phase offsets.
Figure 2B:
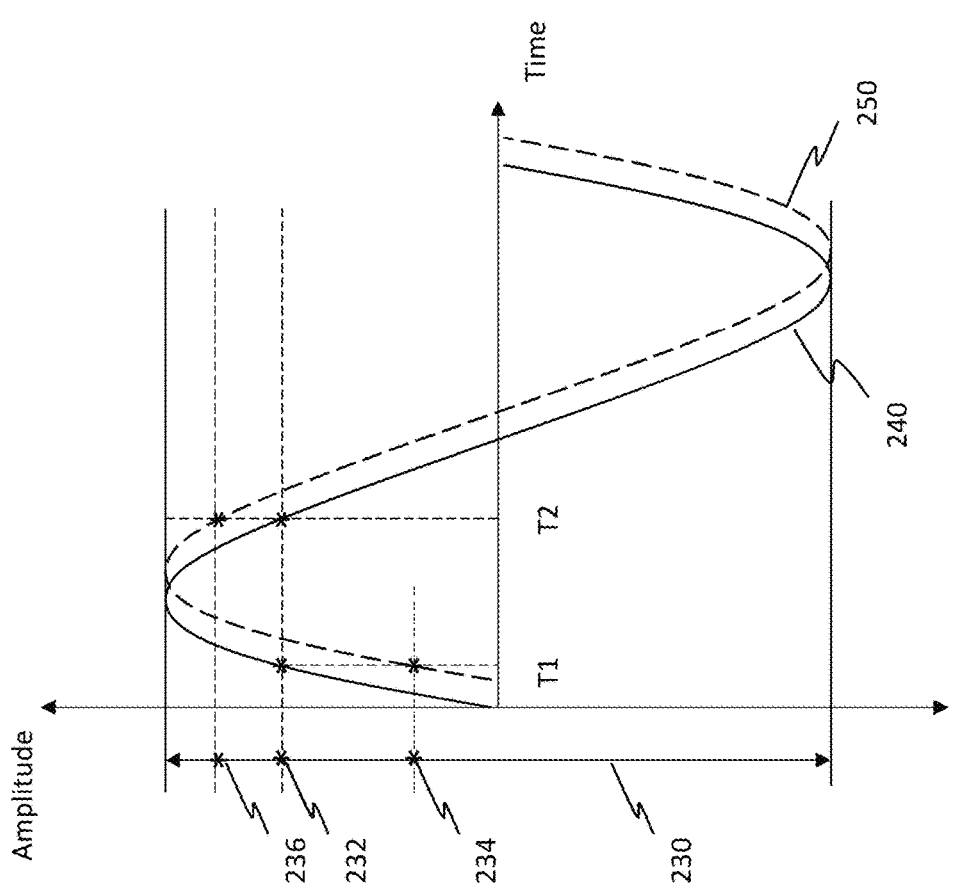

FIGS. 2A and 2B better explain the concept of bi-phase offset. These examples are provided using a scenario involving the projection of dots. One will appreciate, however, how any type of image content can be used, not just dots.

FIG. 2A illustrates a graph that represents an example bi-phase scanning cycle 200A. The vertical axis represents an amplitude of a fast-scanning mirror (e.g., mirror 136); the horizontal axis represents time. During the bi-phase scanning cycle, the bi-phase scanning mirror scans back and forth in the horizontal direction. The line 230 may correspond to any one of the cycles 102C through 108C of FIG. 1C. In this example, any point on the line 230 corresponds to two dots drawn during a same cycle: (1) one is drawn during the forward scanning, and (2) one is drawn during the backward scanning.

Even though the two corresponding dots should be considered distinct, and may in general be drawn using a different color code (i.e. different intensities for the lasers), if the bi-phase is correct in that the bi-phase scanning cycle is synchronized (i.e. no offset), the two corresponding dots should coincide on the horizontal axis, but still be separate along the other axis of the other mirror. For example, the two corresponding points 232 are drawn at the times T1 and T2 of FIG. 2A. When bi-phase is incorrect (i.e., there is a bi-phase offset), such corresponding dots will be separated along both axes. For example, the second corresponding points 234 and 236 are drawn at the time T1 and T2, respectively, of FIG. 2B.

In an ideal case, the amplitude of the scanning mirror corresponds closely to the control signal, such that when a sinusoidal control signal is applied onto the scanning mirror, a corresponding sinusoidal amplitude is generated. However, in reality, there is often a phase shift or delay between the control signal and the amplitude of the scanning mirror. The amount of the phase shift is related to temperature. In general, the higher the temperature, the greater the phase delay may occur. The laser drive 140 must be synchronized with the phase of the mirror to cause the projected image to be clear and not deformed.

FIG. 2B illustrates an example of phase shift of a MEMS scanning mirror (i.e., here, there is a bi-phase offset). As illustrated in FIG. 2B, the dotted line 250 illustrates an amplitude of a MEMS mirror that is shifted from the amplitude 240 (drawn in solid line). Assuming the laser drive 140 is projecting a laser beam based on the amplitude 240, to draw the corresponding dots at position or point 232, the laser beam is projected at time T1 and T2. However, if, in fact, the amplitude has shifted to dotted line 250, at time T1, a first dot will be drawn at point 234; and at time T2, a second dot will be drawn at 236. In this exaggerated example, the two dots or points 234 and 236 (which are supposed to coincide on the vertical axis at 232) are far apart. This will clearly impact the resulting image projected on the display. The same principles apply when there is a slight phase shift when temperature changes, and even when there is a slight shift of the phase, the bi-phase scan may cause the two corresponding dots to be projected at two slightly different places in the bi-phase scanning direction, resulting a blurry and/or deformed image (e.g., double vision).

With the traditional calibration techniques, a system would blank out a section of the screen, display a dot pattern, and then capture an image of that dot pattern, as shown by the image 300 in FIG. 3. Notably, the MEMS system would project a dot on the forward sweep and the backward sweep. In some cases, some uncertainty might exist as to which dot was generated during which sweep of the MEMS system. As a result, the MEMS system would often repeat this projection process multiple times in order to determine which dot was displayed during the forward sweep and which dot was displayed during the backwards sweep. The MEMS system could then compare the multiple images against a calibrated image to determine how out of phase the MEMS was (i.e., determine the bi-phase offset). Often, this image capturing and comparison event would occur every 10-20 seconds. Further, the rastering/projection event would often be performed using at a minimum three frames, which also disrupted the user's experience. Users were finding that this frequent blank out of the screen was problematic.

Improved Calibration Techniques

The disclosed embodiments provide an improved technique for calibrating a MEMS system without requiring a blank out event and also without requiring a predetermined pattern to be displayed.

The embodiments initially determine display pixel coordinates for the display. That is, for each pixel that is displayed on the display, the embodiments determine that pixel's corresponding set of coordinates. By way of further clarification, the embodiments are able to capture an image of the content that is displayed on the screen. The display observing camera 170 generates or captures this image.

Figure 4A:
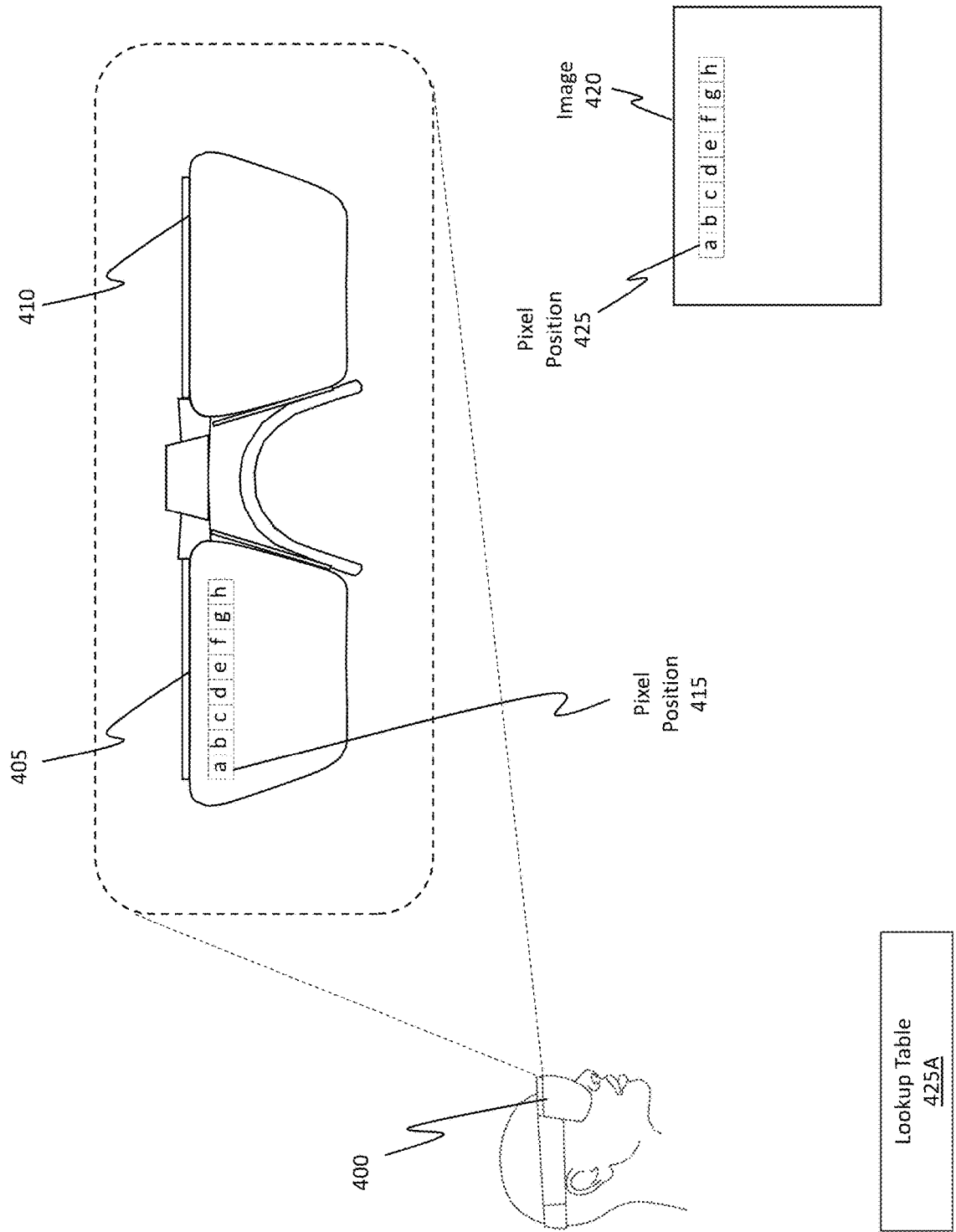
FIGS. 4A and 4B the generation of forward and backward images from an interlaced image generated by a camera on an HMD.

Based on a factory calibration of the MR system/MEMS system, the embodiments are able to correlate pixel positions in the image with pixel positions that are displayed on the screen. Stated differently, the embodiments have a set of calibration parameters that are able to map pixel coordinates of pixels in an image that was generated by the display observing camera 170 and pixel coordinates of pixels (or rather, MEMS projection positions) that are actually displayed on the display 160. FIG. 4A is illustrative.

FIG. 4A shows an example of a head-mounted device of an MR system 400. The MR system 400 can include or can be representative of the MEMS scanning device 100 of FIG. 1A.

The MR system 400 is shown as including a display comprising a left-eye display 405 and a right-eye display 410. Either one of the left-eye display 405 or the right-eye display 410 is representative of the display 160 from FIG. 1A. One will appreciate how each display can include its own corresponding set of the components shown in FIG. 1A.

FIG. 4A shows an exaggerated enlargement of various pixels (or rather, MEMS projection positions), as labeled with "a," "b," "c," "d," "e," "f," "g," and "h." The pixel "a" is shown as having a pixel position 415 or pixel coordinate on the left-eye display 405. During operation, the MEMS system will illuminate this region of the display with laser light. The MEMS system will then illuminate the next region and so on. Provided the MEMS system scans fast enough, an entire display frame can be generated by the MEMS system individually scanning or illuminating respective positions on the display.

The display observing camera 170 from FIG. 1A is able to capture an image 420 of the left-eye display 405 (another display observing camera can capture the image for the right-eye display 410). The embodiments have a set of initial calibration parameters that are able to map pixel positions in the image 420 to the pixel positions on the left-eye display.

For instance, various pixels are labeled in the image 420, as shown by pixels "a," "b," "c," "d," "e," "f," "g," and "h" in image 420. Notably, the pixel "a" has a pixel position 425. Pixel position 425 of pixel "a" in the image 420 corresponds to pixel position 415 of pixel "a" in the left-eye display 405. Accordingly, the embodiments are able to generate or access a set of initial calibration parameters that map pixel positions (i.e., MEMS projection positions) from the display with pixel positions in a generated image that captured the content on the display. The mapping between MEMS projection positions on the display (e.g., pixel position 415) and corresponding pixel positions in the image (e.g., the pixel position 425) can be maintained in a lookup table 425A.

Figure 4B:
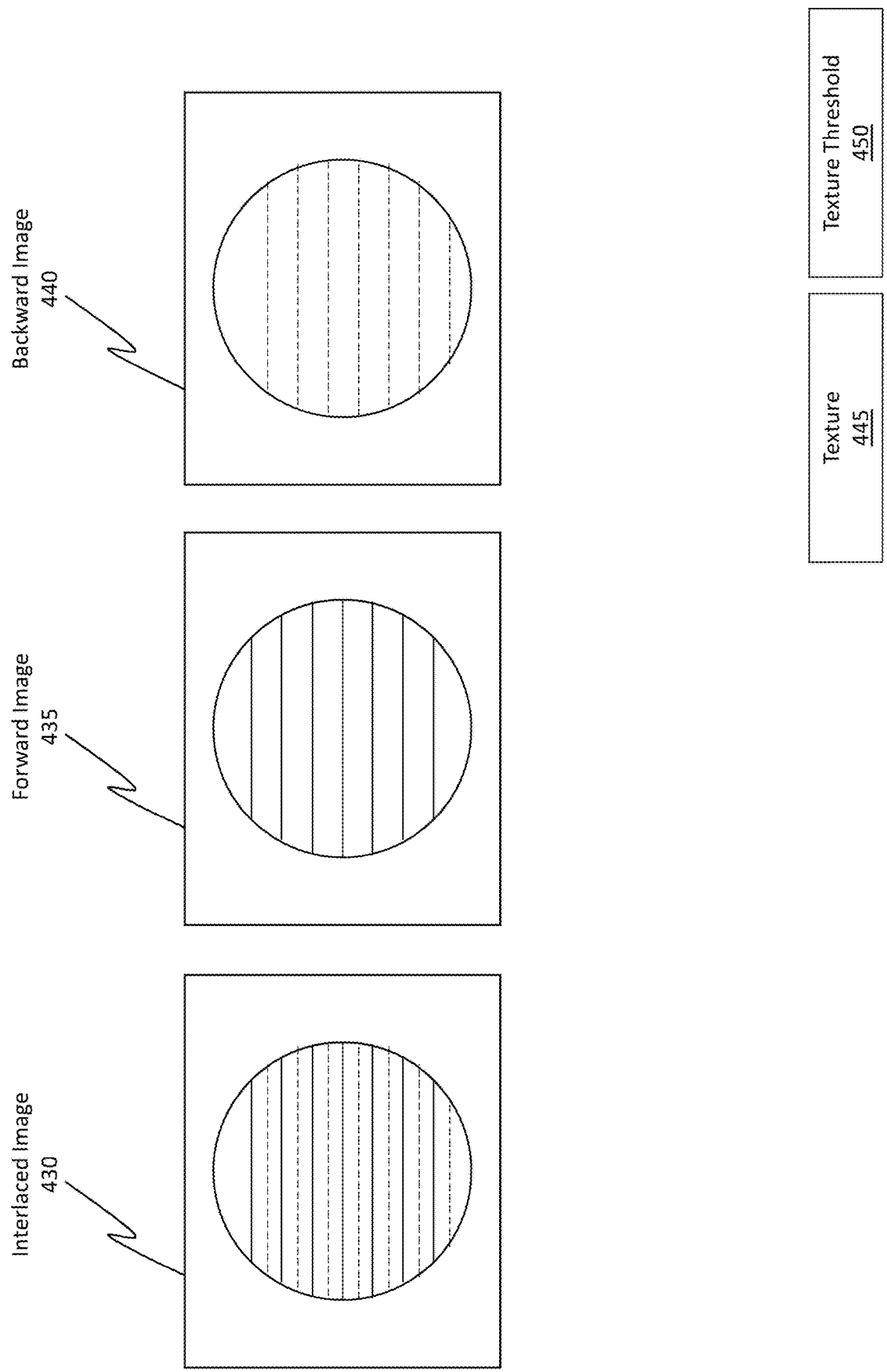

During normal and un-paused use of the MR system and without blanking out the screen, the embodiments generate a frame, which can be referred to as an interlaced image 430 as shown in FIG. 4B. This interlaced image 430 is one that is generated during normal use of the MR system, meaning that this frame may include various levels of holographic content. The interlaced image 430 can be representative of the image 420 from FIG. 4A.

The embodiments are able to parse, isolate, extract, or otherwise separate this interlaced image 430 into two separate images, namely a forward image 435 (aka forward sweeping image) and a backward image 440 (aka backward sweeping image). Inasmuch as the embodiments include information detailing the different pixel positions for the image as they relate to the display and inasmuch as the embodiments include information detailing which pixels correspond to a forward sweep of the MEMS system and which correspond to a backwards sweep of the MEMS system, the embodiments generate the forward image 435 by parsing, from the interlaced image 430, all of the pixels that are generated during forward sweeps of the MEMS. If the first row of pixels in the image is labeled as row 0, then the forward sweeps will include row 0 pixels as well as the pixels in the even-numbered rows.

The embodiments generate the backward image 440 by parsing, isolating, extracting, or otherwise separating, from the interlaced image 430, all of the pixels that are generated during backward sweeps of the MEMS system. If the second row of pixels in the image is labeled as row 1, then the backward sweeps will include the pixels in the odd-numbered rows.

FIG. 4B also shows a texture 445 and a texture threshold 450. Further details on these aspects will be provided later, but by way of a quick introduction, the interlaced image 430 (and optionally the forward image 435 and the backward image 440) will need to have a sufficient amount of texture 445 (i.e., a level of texture that exceeds the texture threshold 450) in order to perform the disclosed operations. Texture 445 refers to the amount of spatial arrangement of color that an image has. In other words, it describes the pixel intensities of the image.

Figure 5A:
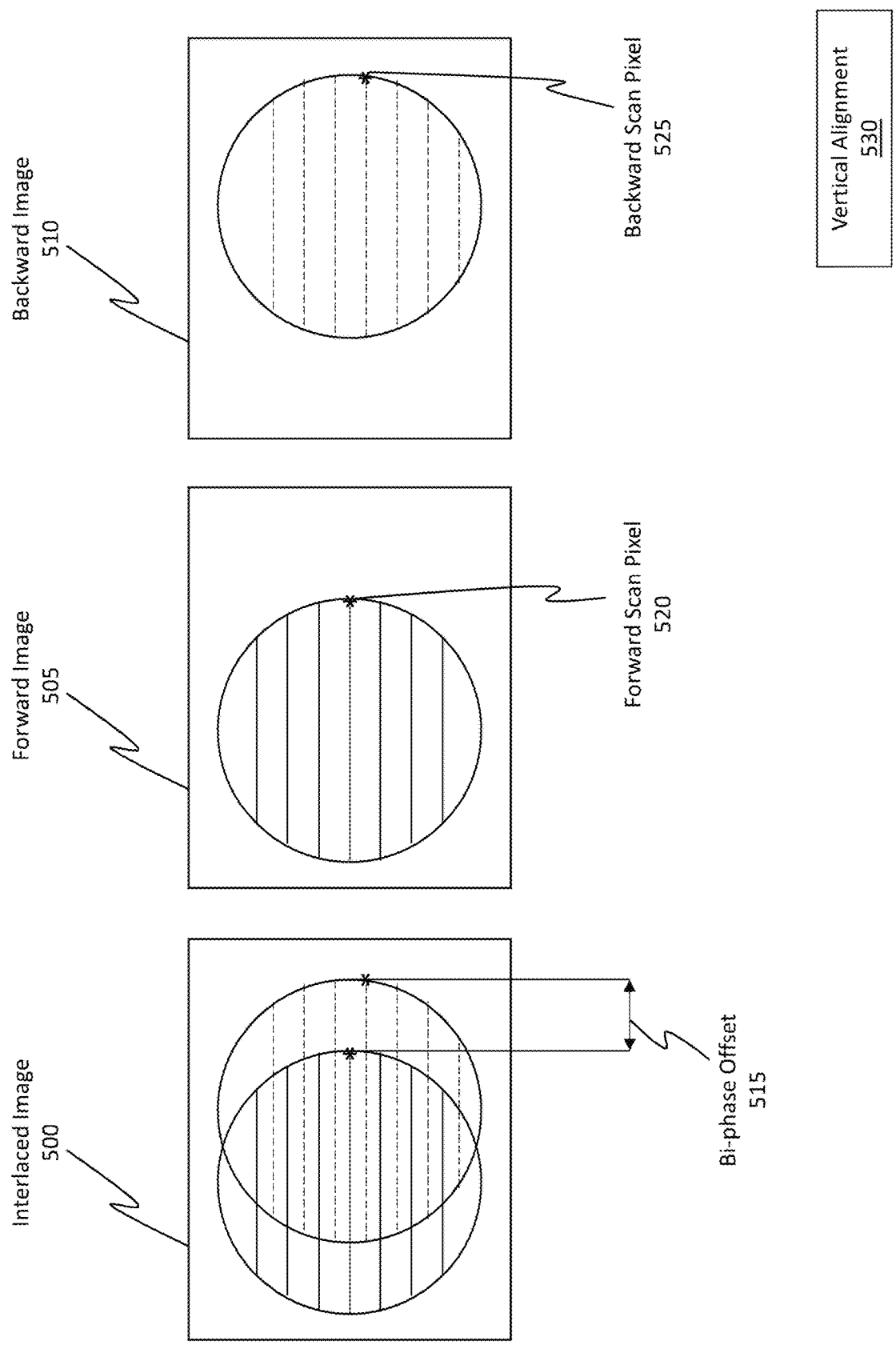
FIGS. 5A and 5B illustrate various techniques for generating a forward image (aka forward sweeping image) and a backward image (aka backward sweeping image).

FIG. 4B shows a calibrated scenario where the MEMS system is properly calibrated and there is no bi-phase offset (e.g., a timing offset that exists between a forward sweep of the MEMS and a backward sweep of the MEMS). In contrast, FIG. 5A shows an uncalibrated scenario involving the interlaced image 500, the resulting forward image 505, and the backward image 510. Notice, here, however, there is an offset or "double vision" in the interlaced image 500, where that offset is the result of a bi-phase offset 515.

By separating out the forward and backward images from the interlaced image, the embodiments are able to compute the amount or level of bi-phase discrepancy (i.e., bi-phase offset or bi-phase value) that exists. Once that bi-phase value is determined, the embodiments can then trigger a calibration event to resolve the bi-phase offset. In contrast with the traditional techniques (e.g., the dot pattern technique requiring display blank out and the collection of multiple images), the embodiments are able to immediately acquire labeled observations that distinguish between forward and backward sweeps of the MEMS from a single frame. The traditional system, on the other hand, required use of multiple frames in order to determine which pixels corresponded to forward sweeps and which corresponded to backward sweeps. Inasmuch as the disclosed embodiments require the use of fewer frames, the embodiments improve the efficiency operations of the computer system in performing the various calibration actions.

When computing the bi-phase offset, the embodiments identify a pixel, point, or area in the forward image 505 and then attempt to identify a corresponding pixel, point, or area in the backward image 510. In some implementations, the pixels are selected based on their pixel coordinates being adjacent to one another. In some implementations, the pixels are selected using machine learning, where the machine learning attempts to select pixels that represent the same or similar content. In some implementations, the pixels are selected based on their color values (e.g., pixels that have the same or similar color values).

For instance, FIG. 5A shows a selected pixel in the forward image 505, as labeled by forward scan pixel 520. This pixel was generated while the MEMS system was projecting pixels in a forward sweep. FIG. 5A also shows a selected pixel in the backward image 510, as labeled by backward scan pixel 525. These two pixels are as closely proximate to one another. To illustrate, the forward scan pixel 520 is at the end of a forward sweep of the MEMS system, and the backward scan pixel 525 is at the beginning of the next backward sweep of the MEMS system. Selecting these pixels results in a minimum distance being placed between a selected pixel in the forward image 505 and a selected pixel in the backward image 510. To clarify, in this scenario, a first pixel is selected from one scanning line, which is generated during the forward sweep, and a second pixel is selected from a different scanning line, which is generated during the backward sweep. In this scenario, the last pixel from the forward sweep is selected and the first pixel from the backward sweep is selected. These two pixels should be adjacent to one another despite being on different lines. Consequently, these two pixels should be highly proximate to one another. By selecting proximate pixels, subsequent vertical and/or horizontal alignment processes can be reduced to a minimum.

The bi-phase value/offset can optionally be selected by computing the horizontal distance that exists between the forward scan pixel 520 and the backward scan pixel 525. In some cases, multiple bi-phase values may be computed. For instance, multiple pixels from multiple lines may be selected from the forward image 505 and multiple, corresponding pixels, may be selected from the backward image 510. The embodiments can then use these pixels to compute multiple bi-phase values. In some instances, those multiple bi-phase values may be different relative to one another such that the bi-phase values might be different for different lines of the forward and backward images.

Some embodiments perform a vertical alignment 530 operation. For instance, observing FIG. 5A, one can readily see how the forward scan pixel 520 has a slight vertical offset relative to the backward scan pixel 525. In this particular, the vertical offset is the equivalent of the distance of one line. Different techniques can be performed for this vertical alignment 530 operation.

In some cases, the embodiments perform a vertical alignment operation by shifting either the forward scan pixel 520 or the backward scan pixel 525 (or perhaps the row comprising these pixels) some distance (e.g., perhaps one line) to compensate for whatever offset exists between those two pixels.

Optionally, the amount of the vertical alignment 530 can be set such that the level of amount of correlation between the two pixels is adjusted to be a maximum level of correlation. That is, based on various statistical properties of the two pixels, there will be some level of vertical offset adjustment that results in those two pixels having a highest level of correlation relative to one another. The embodiments can choose the adjustment to achieve this highest level of correlation.

Other techniques can be performed for the vertical alignment 530 operation. For instance, some embodiments optionally "fill in" or "restore" the missing points in one or both of the forward image 505 or the backward image 510 so that a horizontal bi-phase determination can then subsequently be computed based on a verified correspondence of pixels.

One example embodiment duplicates a nearest neighboring pixel to "fill in" the missing pixel. For instance, with reference to FIG. 5A, the backward scan pixel 525 is shown as being slightly lower than the forward scan pixel 520. The embodiments are able to correct for this vertical offset by selecting a nearest neighboring pixel to at least one of the forward scan pixel 520 or the backward scan pixel 525. This nearest neighboring pixel is selected to compensate for the vertical offset. Once that vertical offset is compensated for (i.e., removed) via the selection of the nearest neighboring pixel, the embodiments can then use that same selected pixel to compute a horizontal offset, as will be discussed shortly. That is, the selected pixel will retain the horizontal offset that exists between the forward scan pixel 520 and the backward scan pixel 525, but it will be selected so as to eliminate the vertical offset that exists between the forward scan pixel 520 and the backward scan pixel 525.

Figure 5B:
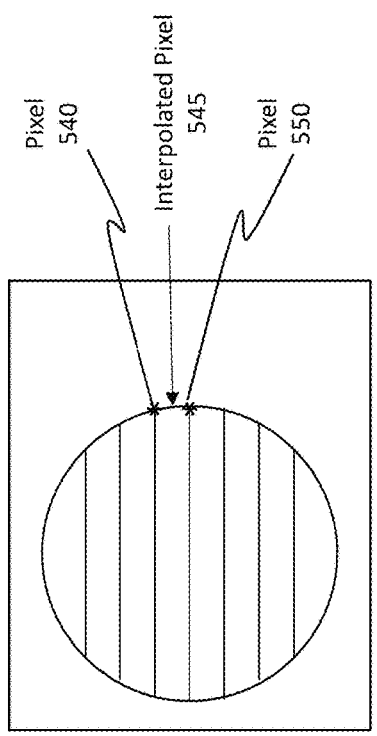

Another way to "restore" the missing points is via an interpolation process. FIG. 5B shows an example interpolation approach 535 that is representative. Here, two pixels are identified, as shown by pixel 540 and pixel 550. It should be noted how more than two pixels can optionally be used. Indeed, the interpolation can be a weighted average of all pixels to restore a pixel value at any point in the image. The disclosed principles are not necessarily restricted to two pixels in its neighborhood. As such, this scenario is being provided as an example only and should not be viewed as being limiting.

These pixels can be in either one of the forward image or the backward image. It is desirable to compute an interpolated pixel 545 that exists between the pixel 540 and the pixel 550 in order to remove the vertical offset. To compute this interpolated pixel 545, some embodiments compute a linear average, convex combination, or perhaps even a weighted average of the intensity values of the pixel 540 and 550. Some embodiments compute a bilinear interpolation of those two pixels, where the bilinear interpolation can include a bilinear interpolation of the four neighboring pixels for a particular point/pixel. Such a process can be performed to fill in the missing pixel context that currently exists at the location between the pixels 540 and 550. To subsequently compute the horizontal disparity/offset (i.e., bi-phase offset), it is beneficial to have exact vertical correspondences between the forward image and the backward image.

With reference to the above various techniques, the line shifting technique can be viewed as a simplistic or naïve approach. The nearest neighbor and the interpolation techniques can be viewed as being more complex approaches. One potential risk of performing the line shifting approach is that if the shifted pixel represents entirely different content (despite it being only one line away), then it may skew the computation. The more complex approaches better resolve such scenarios (i.e., where a pixel that is just one line away represents entirely different content, such as is the case for border regions of content). Machine learning can also be implemented to smooth out any of the above approaches (e.g., smooth out the pixel values).

Having performed the vertical alignment, some embodiments then select a single pixel from the forward image and a corresponding single pixel from the backward image. A horizontal disparity (i.e., bi-phase offset) can then be computed based on these two selected pixels. Thus, a single pair of pixels can optionally be used to compute the bi-phase offset for an entire area (e.g., the area being the entire image). This single-pixel approach may reduce the accuracy but it also improves (e.g., decreases) the computational time. Accordingly, the computation of the horizontal offset is computed after the vertical offset adjustment (i.e., the vertical alignment 530).

On the other hand, some embodiments compute multiple horizontal disparities by selecting pixels from multiple lines of the images and then computing multiple horizontal disparities. In some cases, a pixel is selected for every line in the images. In some embodiments, a pixel is selected for some, but not all, of the lines in the images. Thus, multiple pairs of pixels can optionally be used to compute the bi-phase offset for an entire area (e.g., the area being the entire image). This approach may increase the accuracy, but it will also increase the computational time. Accordingly, the embodiments are able to select an area in the forward image and select a corresponding area in the backward image. These selected areas can be as small as a single pixel. In some cases, the selected area can include multiple lines. The embodiments then select one or more pixels from the selected areas to compute the bi-phase offset by calculating the horizontal offset that exists between the selected pixels from the two images. Optionally, a single line can be selected. Optionally, multiple lines can be selected.

In some cases, computing the horizontal offset can optionally be performed by overlaying the backward image onto the forward image. The embodiments then horizontally shift the backward image (or, alternatively, the forward image) in an attempt to identify a scenario where those two images become most aligned relative to one another. The amount of this shift is then set as the horizontal offset, which represents the bi-phase offset that exists. Some embodiments impose various sizing constraints on the forward and backward images. For instance, when overlaying the two images, some embodiments will reduce the size of those images based on a specific area of interest that is selected to determine the correlation. The size can be reduced based on a selected reduction in the number of pixels that will be included in the images. The size can be reduced by cropping or trimming the images a selected amount or percentage. In some cases, the sides of the images can be cropped such that the images are horizontally shorter than before.

Accordingly, in order to compute the normalized correlation between the images, the embodiments attempt to create a perfect alignment between those images by performing any of the vertical alignment processes mentioned earlier as well as the horizontal alignment processes. The disclosed embodiments utilize an error-based metric (e.g., the horizontal shifting process to detect a "most aligned" condition) to compute the bi-phase offset. By way of further clarification, an interpolated cross-correlation process can be performed to find the bi-phase discrepancy. The embodiments can also compute the cross-correlation between interpolated forward and backward images. Optionally, a Fourier transform can be used to restore missing values in the forward and backward images. Further, optimal estimation algorithms (e.g., Kalman and Particle filters) can be used to consider the uncertainty information for the offset parameters, which are used during the calibration event. Further details on the Kalman filter will be provided shortly.

To perform the above processes, the forward image and the backward image need to have a sufficient amount of texture. That is, the level of texture in the images should meet or exceed a minimum texture requirement. If the detected texture levels of the images fall below the threshold, then it may be difficult to identify adequate pixels that can be used to perform the vertical and horizontal alignments. Thus, if the level of texture is below the threshold, some embodiments revert to the traditional technique of blanking the screen and projecting the dot pattern to then perform the calibration. FIG. 4B illustrated this texture threshold 450.

Some embodiments compute a confidence metric to indicate how confident the embodiments are in computing the horizontal offset value. For example, the variance of the horizontal offset value. This confidence metric can be provided to the MR system to determine whether the MR system should proceed with using the computed offset to perform the calibration or, alternatively, should proceed with the traditional approach. That is, if the confidence metric meets or exceeds a predefined threshold, then the MR system may elect to use the calculated horizontal offset (bi-phase offset) to then perform its calibration. If the confidence metric falls below the threshold, then the MR system may elect to use the traditional blank out approach.

In some implementations, a Kalman filter or extended Kalman filter can be used to take into account the dynamics of the biphase correction. It is particularly powerful during scenarios that involve low or poor confidence metrics of the bi-phase offset. For instance, the embodiments can utilize a Kalman filter or extended Kalman filter to consider the past bi-phase offset estimates and their variances when computing new bi-phase and/or calibration parameters. Doing so enables the embodiments to improve the robustness of the display calibration. The embodiments can be triggered to utilize the Kalman filter or extended Kalman filter to essentially reject a current, poor performing estimate of the bi-phase offset and to use historical data to generate a new bi-phase offset estimate based on the Kalman filter or extended Kalman filter. In some implementations, historical data that is more recent may be attributed a higher relevance rating or perhaps a higher priority in computing the bi-phase offset estimate.

In situations where the texture of the images that are visible in the display are below the texture threshold, some embodiments use steganography, which is a technique for obscuring or hiding a set of secret data within non-secret data, to add texture. For instance, the embodiments can optionally impose a type of watermark or static image into the display. This static image can be displayed using infrared light (IR) such that it is not visible to a human user. The display observing camera 170 can be configured to detect both IR light and visible light. As a result, the display observing camera 170 will be able to detect the static image. The introduction of IR light can operate to add texture when the detected texture levels are too low.

In some cases, the static image can be visible light, but it might be quite small. For instance, the static image might be only a single pixel in size, where this single pixel is an added pixel that would not normally be included in the image. In some cases, the static image might be one or a set of multiple pixels that are normally included in an image, but the intensity of those pixels might be modified slightly. Such operations beneficially add texture to the resulting images that are generated by the display observing camera 170.

Some embodiments perform a sub-pixel refinement process in order to determine a more granular or more accurate determination of the bi-phase offset. The sub-pixel refinement is performed subsequent to the previous correlation or cross-correlation operations. Further details regarding the cross-correlation operations are provided below. The sub-pixel refinement will then be discussed.

For continuous real-valued functions $f$ and $g$, their cross-correlation is defined as:

$$(f * g)(\tau) = \int_{-\infty}^{\infty} f(t)g(t+\tau)dt = \int_{-\infty}^{\infty} f(t-\tau)g(t)dt$$

where $\tau$ is called displacement or lag. For highly correlated $f$ and $g$ which have a maximum cross-correlation at a particular $\tau^*$, a feature in $f$ at t also occurs later in g at $\tau^*$, hence g could be described to lag $f$ by $\tau^*$:

$$\tau^* = \underset{\tau}{\operatorname{argmax}}(f*g)(\tau)$$

Similarly, for discrete functions, the cross-correlation is defined as:

$$(f*g)[n] = \sum_{m=-\infty}^{\infty} f(m)g(m+n)$$

where n is also called displacement or lag. For highly correlated $f$ and $g$ which have a maximum cross-correlation at a particular $n^*$, a feature in $f$ at m also occurs later in g at n, hence g could be described to lag $f$ by $n^*$:

$$n^* = \underset{n}{\operatorname{argmax}}(f*g)(n)$$

For the interlaced image, the even (e.g., forward sweep) and odd (e.g., backward sweep) sweeps are to be correlated, as shown in FIG. 6. FIG. 6 shows a chart for an even sweep 600 and a chart for an odd sweep 605. Let $f$ and g be even and odd sweeps, respectively. The maximizer of discrete cross-correlation is the bi-phase value with discrete precision.

Figure 7:
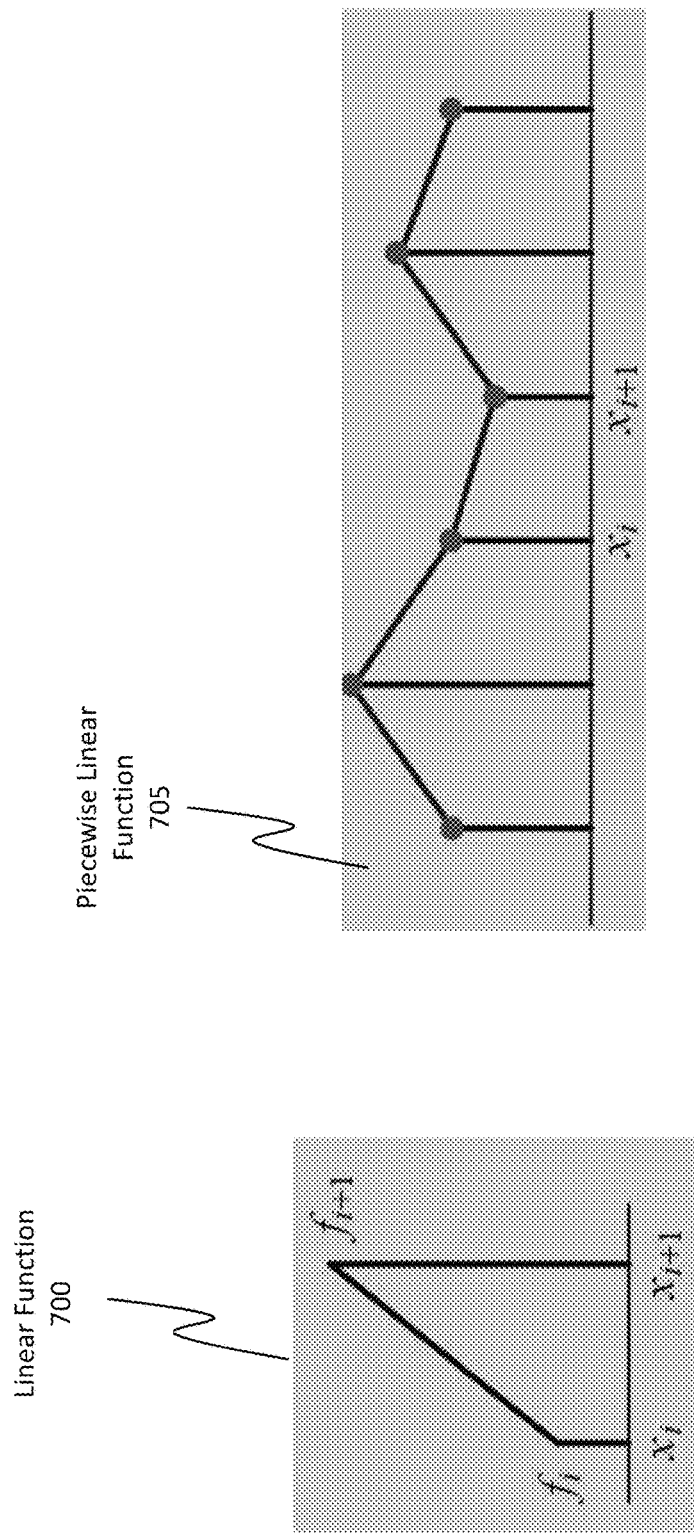
FIG. 7 illustrates various different charts of functions.

In mathematics, linear interpolation is a method of curve fitting using linear polynomials to construct new data points within the range of a discrete set of known data points. If the two known points are given by the coordinates $(x_0, y_0)$ and $(x_1, y_1)$, the linear interpolant is the straight line between these points. For a value x in the interval $(x_0, x_1)$, the value y along the straight line is given from the equation of slopes shown by the linear function 700 of FIG. 7. Linear interpolation on a data set consists of pieces of linear interpolants, as shown by the piecewise linear function 705 of FIG. 7.

After the cross-correlation of two discrete functions, the sub-pixel refinement obtains the bi-phase value with decimal precision with their interpolated functions. The continuous function of intensity distribution in the image can be computed. Interpolation attempts to fill in this value from sparse data. Linear interpolation can be used for its simplicity while the cubic spline can also be used for smoothness of its second derivative. FIG. 8 shows an example implementation of the sub-pixel refinement by showing the even sweep 800 and the odd sweep 805.

It is possible to obtain the discrete bi-phase value to maximize the cross-correlation. Let n* be the discrete bi-phase value. As assumption can be made that the bi-phase value of the odd sweep τ* against the even sweep belongs to the neighbor of n* with the radius 1, i.e., τ*∈(n*−1, n*+1).

The cross-correlation of the second interval can then be determined. Using these various different intervals and cross-correlations, the embodiments are able to provide an improved level of granularity and accuracy with regard to determining the bi-phase and the amount of offset.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9A:
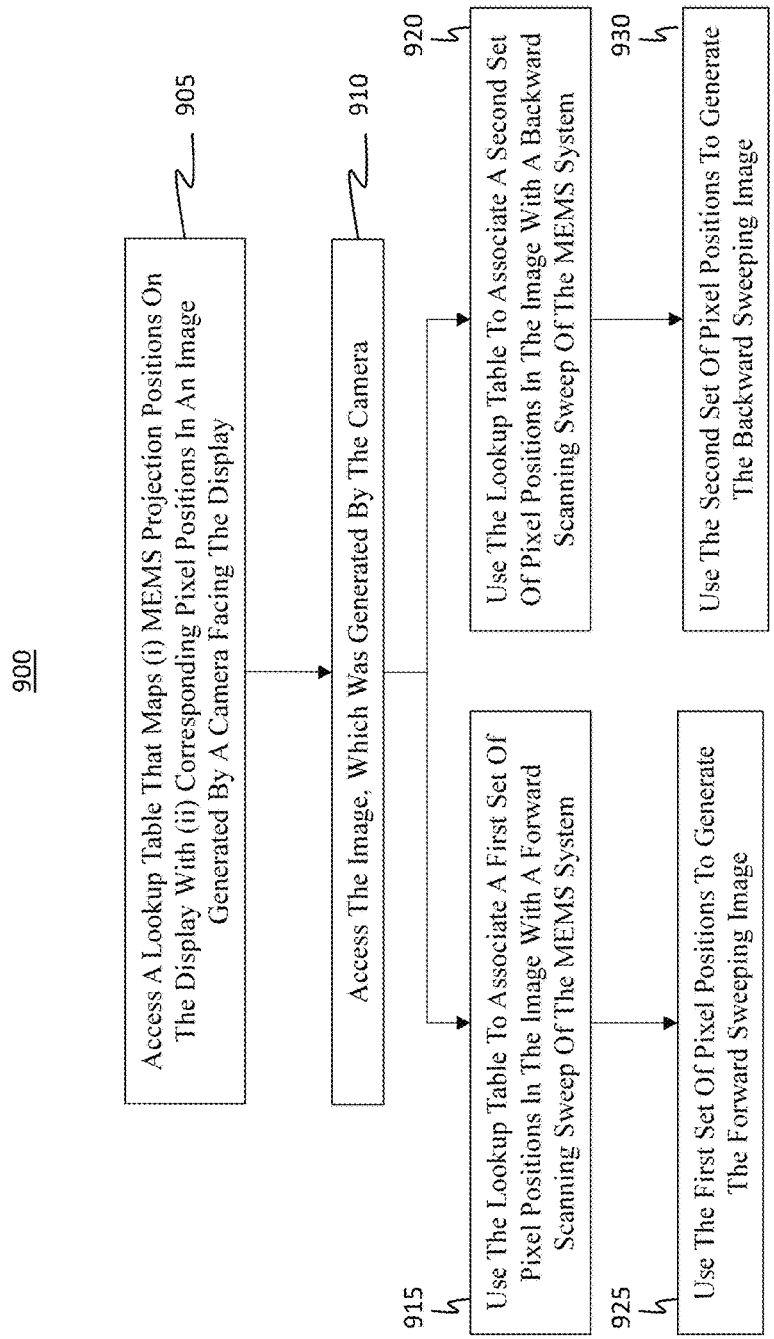
FIGS. 9A and 9B illustrate flowcharts of an example method for generating forward sweeping images and backward sweeping images.
Figure 9B:
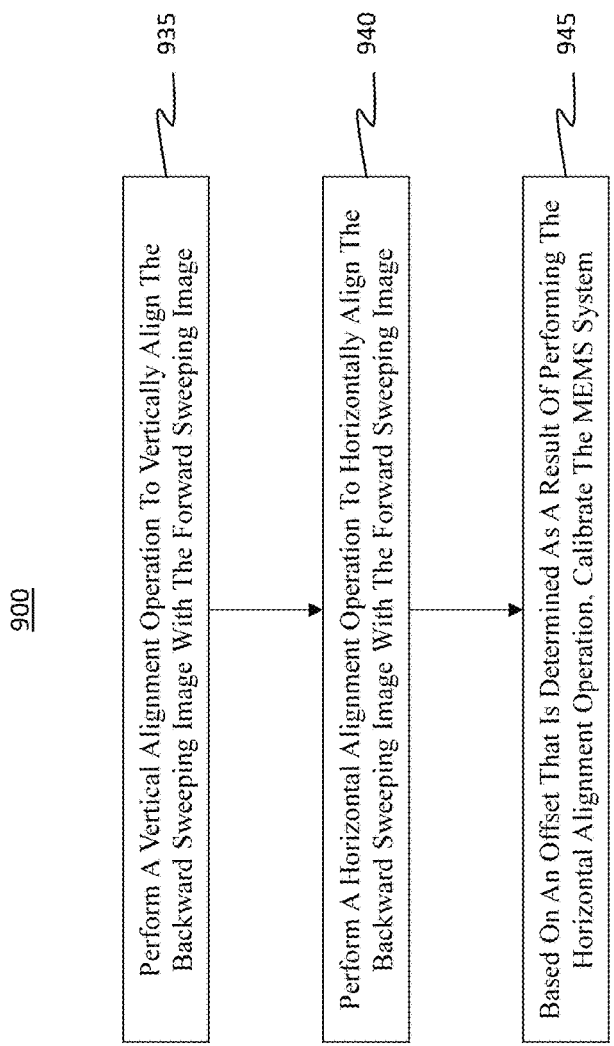

Attention will now be directed to FIGS. 9A and 9B, which illustrate flowcharts of an example method 900 for separating an image into a forward sweeping image and a backward sweeping image. These images can then be used to determine a bi-phase offset of the MEMS system. The system can then self-calibrate using the known bi-phase offset. The image is taken by a camera that is facing a display (e.g., the display observing camera 170 from FIG. 1A) on which a micro-electromechanical scanning (MEMS) system is projecting rendered content.

Optionally, method 900 can be performed by the MEMS scanning device 100, which can be an example of a mixed-reality (MR) device. In some cases, the MR device can be a head-mounted device (HMD). Consequently, the method 900 can optionally be performed by a wearable MR system, such as in the form of an HMD and such that the computer system, or rather the wearable MR system, includes the display and the MEMS system. In some cases, method 900 can optionally be performed by a cloud service operating in a cloud environment. The display mentioned above can be one of a left-eye display or a right-eye display for the MR system.

There are various benefits from performing method 900. Some such benefits (though certainly not all) is that method 900 can be performed without blanking out (or refraining from blanking out) any sections of the display, which is in contrast with the traditional methodologies. Additionally, method 900 can be performed without displaying (or refraining from displaying) a predetermined pattern on the display. Instead, method 900 can be performed using whatever content is already projected onto the display without interrupting the projected scene or holograms.

As shown in FIG. 9A, method 900 includes an act (act 905) of accessing a lookup table (e.g., lookup table 425A in FIG. 4A). This lookup table maps (i) MEMS projection positions on the display, where the MEMS projection positions correspond to positions on the display where the MEMS system projects content, with (ii) corresponding pixel positions in an image generated by a camera facing the display. The lookup table is often generated during an initial calibration event for the MEMS system, such as perhaps a factory calibration event.

Act 910 includes accessing the image, which was generated by the camera. For instance, the camera can be the display observing camera 170 (e.g., a display alignment tracker (DAT) camera) from FIG. 1A. Notably, the image is generated after a full image frame is projected by the MEMS system onto the display. That is, the MEMS system completes all projections for this particular frame and is resetting itself to initiate projection for a new frame. It is during this reset transition period or immediately after the last scan finished when the camera generates the image of the display.

The embodiments are able to determine a texture level for this image. Furthermore, the embodiments are able to determine whether a texture level of the image meets or exceeds a minimum texture level requirement. If the texture level does not meet or exceed the minimum texture level requirement, the MR system may fall back to performing the traditional approach for calibration, such as by blanking out the screen and projecting a known pattern.

Alternatively, the MR system may attempt to add texture to the display. For instance, the embodiments can determine an amount of texture in the image and then determine that the amount of texture in the image is below a texture threshold. The embodiments can cause the MEMS system to add texture to a subsequent projection of a subsequent display frame. The embodiments then cause the camera to generate a subsequent image of the subsequent display frame. The embodiments then generate a new forward sweeping image and a new backward sweeping image based on the subsequent image.

Act 915 then includes using the lookup table to associate a first set of pixel positions in the image with a forward scanning sweep of the MEMS system. In parallel, act 920 includes using the lookup table to associate a second set of pixel positions in the image with a backward scanning sweep of the MEMS system. For instance, it will typically be the case that the image includes multiple rows of pixels. To illustrate, FIG. 4A shows how the image 420 includes at least one row comprising the pixels "a-h". Typically, there will be multiple rows of pixels in the image. FIG. 4A is showing only a single row for brevity purposes.

One row in the image will correspond to a set of content that is displayed while the MEMS system is performing a forward sweep. The next row in the image will correspond to a set of content that is displayed while the MEMS system is performing a backward sweep. The embodiments are able to make associations between the movement of the MEMS system with the positions of pixels in an image.

Act 925 includes using the first set of pixel positions to generate the forward sweeping image. Notably, generating the forward sweeping image is performed by extracting first pixel content from the image at each pixel position in the first set of pixel positions and including that extracted first pixel content in the forward sweeping image. In parallel, act 930 includes using the second set of pixel positions to generate the backward sweeping image. The process of generating the backward sweeping image is performed by extracting second pixel content from the image at each pixel position in the second set of pixel positions and including that extracted second pixel content in the backward sweeping image.

In some cases, the first pixel content is obtained from all even-numbered rows of pixels in the image. Similarly, in some cases, the second pixel content is obtained from all odd-numbered rows of pixels in the image.

Method 900 can continue, as shown in FIG. 9B. For instance, after the forward and backward sweeping images are generated, method 900 can include an act (act 935) of performing a vertical alignment operation to vertically align the backward sweeping image with the forward sweeping image. Previously, there were mentioned various different options for performing this vertical alignment. To illustrate, the vertical alignment operation can be selected from one of: a line shifting operation, a nearest neighbor operation, or an interpolation operation. The vertical alignment operation restores missing content in one or both of the forward sweeping image or the backward sweeping image. Missing content exists in each image because each image includes only half of the pixel content as the original image generated by the camera. It is desirable, however, to provide a perfect alignment, or at least an alignment that meets an alignment threshold, between the two images in order to accurately perform calibration.

Act 940 includes performing a horizontal alignment operation to horizontally align the backward sweeping image with the forward sweeping image. The horizontal alignment operation is performed after the vertical alignment operation. Based on the horizontal alignment operation, the embodiments can determine a level of offset (i.e., bi-phase offset) that existed between the forward sweeping image and the backward sweeping image. The embodiments can set the level of offset as a parameter for a bi-phase offset that exists between the forward sweeping image and the backward sweeping image. In some cases, a confidence metric is calculated to indicate how well the backward sweeping image is aligned with the forward sweeping image. For example, the variance of the bi-phase estimate.

Based on an offset (e.g., the bi-phase) that is determined as a result of performing the horizontal alignment operation, act 945 includes calibrating the MEMS system. That is, the embodiments can trigger a calibration event for the MEMS system to compensate for the bi-phase offset.

Accordingly, the disclosed embodiments relate to new and improved techniques for facilitating a calibration event of a MEMS system to compensate for a bi-phase offset. The embodiments reduce power usage and improve computing efficiency.

Example Computer/Computer Systems

Figure 10:
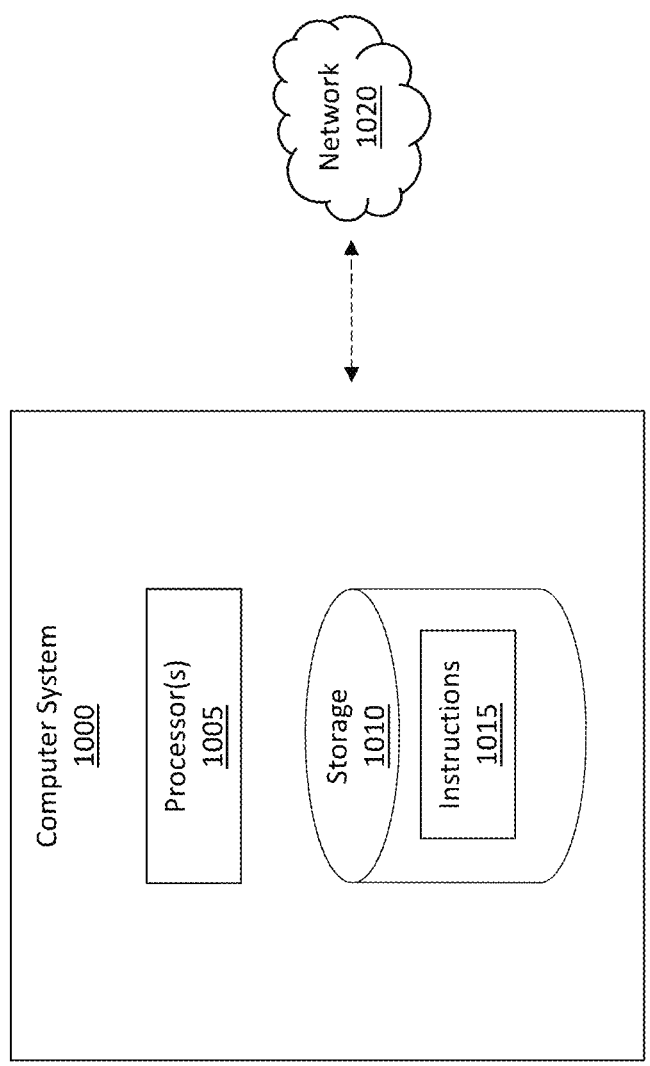
FIG. 10 illustrates an example computer system that can be configured to perform any of the disclosed operations.

Attention will now be directed to FIG. 10 which illustrates an example computer system 1000 that may include and/or be used to perform any of the operations described herein. For instance, the computer system 1000 can be the MR system mentioned earlier or the computer system 1000 can implement the cloud service mentioned earlier. Computer system 1000 may take various different forms. For example, computer system 1000 may be embodied as a tablet, a desktop, a laptop, a mobile device, or a standalone device, such as those described throughout this disclosure. Computer system 1000 may also be a distributed system that includes one or more connected computing components/devices that are in communication with computer system 1000.

In its most basic configuration, computer system 1000 includes various different components. FIG. 10 shows that computer system 1000 includes one or more processor(s) 1005 (aka a "hardware processing unit") and storage 1010.

Regarding the processor(s) 1005, it will be appreciated that the functionality described herein can be performed, at least in part, by one or more hardware logic components (e.g., the processor(s) 1005). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1000. The different components, modules, engines, and services described herein may be implemented as objects or processors that execute on computer system 1000 (e.g., as separate threads).

Storage 1010 may be physical system memory, which may be volatile, non-volatile, or some combination of the two. The term "memory" may also be used herein to refer to non-volatile mass storage such as physical storage media. If computer system 1000 is distributed, the processing, memory, and/or storage capability may be distributed as well.

Storage 1010 is shown as including executable instructions 1015. The executable instructions 1015 represent instructions that are executable by the processor(s) 1005 of computer system 1000 to perform the disclosed operations, such as those described in the various methods.

The disclosed embodiments may comprise or utilize a special-purpose or general-purpose computer including computer hardware, such as, for example, one or more processors (such as processor(s) 1005) and system memory (such as storage 1010), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1000 may also be connected (via a wired or wireless connection) to external sensors (e.g., one or more remote cameras) or devices via a network 1020. For example, computer system 1000 can communicate with any number devices or cloud services to obtain or process data. In some cases, network 1020 may itself be a cloud network. Furthermore, computer system 1000 may also be connected through one or more wired or wireless networks to remote/separate computer systems(s) that are configured to perform any of the processing described with regard to computer system 1000.

A "network," like network 1020, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1000 will include one or more communication channels that are used to communicate with the network 1020. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g., cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for separating an image into a forward sweeping image and a backward sweeping image, said image being taken by a camera that is facing a display on which a micro-electromechanical scanning (MEMS) system is projecting rendered content, said method comprising:
   accessing a lookup table that maps (i) MEMS projection positions on the display with (ii) corresponding pixel positions in an image generated by a camera facing the display, where the MEMS projection positions correspond to positions on the display where the MEMS system projects content;
   accessing the image, which was generated by the camera;
   using the lookup table to associate a first set of pixel positions in the image with a forward scanning sweep of the MEMS system;
   using the lookup table to associate a second set of pixel positions in the image with a backward scanning sweep of the MEMS system;
   using the first set of pixel positions to generate the forward sweeping image, wherein generating the forward sweeping image is performed by extracting first pixel content from the image at each pixel position in the first set of pixel positions and including said extracted first pixel content in the forward sweeping image; and
   using the second set of pixel positions to generate the backward sweeping image, wherein generating the backward sweeping image is performed by extracting second pixel content from the image at each pixel position in the second set of pixel positions and including said extracted second pixel content in the backward sweeping image.

2. The method of claim 1, wherein the method is performed by a wearable mixed-reality (MR) system.

3. The method of claim 1, wherein the method is performed without blanking out any sections of the display.

4. The method of claim 1, wherein the method is performed without displaying a predetermined pattern on the display.

5. The method of claim 1, wherein a texture level of the image is determined to meet or exceed a minimum texture level requirement.

6. The method of claim 1, wherein the image is generated after a full image frame is projected by the MEMS system onto the display.

7. The method of claim 1, wherein the lookup table is generated during an initial calibration event of the MEMS system.

8. The method of claim 1, wherein the image includes multiple rows of pixels, wherein the first pixel content is obtained from all even-numbered rows of pixels in the image, and wherein the second pixel content is obtained from all odd-numbered rows of pixels in the image.

9. The method of claim 1, wherein the method further includes:
after generation of the forward sweeping image and the backward sweeping image, performing a vertical alignment operation to vertically align the forward sweeping image with the backward sweeping image.

10. The method of claim 9, wherein the method further includes:
after performing the vertical alignment operation, performing a horizontal alignment operation to horizontally align the forward sweeping image with the backward sweeping image.

11. The method of claim 10, wherein the method further includes;
based on the horizontal alignment operation, determining a level of offset that existed between the forward sweeping image and the backward sweeping image;
setting the level of offset as a parameter for a bi-phase that exists between the forward sweeping image and the backward sweeping image; and
triggering a calibration event for the MEMS system to compensate for the bi-phase.

12. The method of claim 1, wherein the display is one of a left-eye display or a right-eye display for a mixed-reality (MR) system.

13. The method of claim 1, wherein the method further includes:
determining an amount of texture in the image;
determining that the amount of texture in the image is below a texture threshold;
causing the MEMS system to add texture to a subsequent projection of a subsequent display frame;
causing the camera to generate a subsequent image of the subsequent display frame; and
generating a new forward sweeping image and a new backward sweeping image based on the subsequent image.

14. The method of claim 1, wherein:
after generation of the forward sweeping image and the backward sweeping image, the method includes performing a vertical alignment operation to vertically align the forward sweeping image with the backward sweeping image,
the vertical alignment operation is selected from one of: a line shifting operation, a nearest neighbor operation, or an interpolation operation, and
the vertical alignment operation restores missing content in one or both of the forward sweeping image or the backward sweeping image.

15. The method of claim 1, wherein:
the method further includes performing a horizontal alignment operation to horizontally align the forward sweeping image with the backward sweeping image, and
a confidence metric is calculated to indicate how well the backward sweeping image is aligned with the forward sweeping image.

16. A computer system that separates an image into a forward sweeping image and a backward sweeping image, said image being taken by a camera that is facing a display on which a micro-electromechanical scanning (MEMS) system is projecting rendered content, said computer system comprising:
at least one processor; and
at least one hardware storage device that stores instructions that are executable by the at least one processor to cause the computer system to:
access a lookup table that maps (i) MEMS projection positions on the display, where the MEMS projection positions correspond to positions on the display where the MEMS system projects content, with (ii) corresponding pixel positions in an image generated by a camera facing the display;
access the image, which was generated by the camera;
use the lookup table to associate a first set of pixel positions in the image with a forward scanning sweep of the MEMS system;
use the lookup table to associate a second set of pixel positions in the image with a backward scanning sweep of the MEMS system;
use the first set of pixel positions to generate the forward sweeping image, wherein generating the forward sweeping image is performed by extracting first pixel content from the image at each pixel position in the first set of pixel positions and including said extracted first pixel content in the forward sweeping image; and
use the second set of pixel positions to generate the backward sweeping image, wherein generating the backward sweeping image is performed by extracting second pixel content from the image at each pixel position in the second set of pixel positions and including said extracted second pixel content in the backward sweeping image.

17. The computer system of claim 16, wherein the computer system is a wearable mixed-reality (MR) device, and wherein the computer system includes the display and the MEMS system.

18. The computer system of claim 16, wherein the instructions are further executable to cause the computer system to:
perform a vertical alignment between the forward sweeping image and the backward sweeping image; and
after the vertical alignment is performed, perform a horizontal alignment between the forward sweeping image and the backward sweeping image.

19. The computer system of claim 18, wherein a calibration event is triggered based on an offset that is determined as a result of performing the horizontal alignment.

20. A method for separating an image into a forward sweeping image and a backward sweeping image, said image being taken by a camera that is facing a display on which a micro-electromechanical scanning (MEMS) system is projecting rendered content, said method comprising:
accessing the image, which was generated by the camera;
associating a first set of pixel positions in the image with a forward scanning sweep of the MEMS system;
associating a second set of pixel positions in the image with a backward scanning sweep of the MEMS system;
using the first set of pixel positions to generate the forward sweeping image, wherein generating the forward sweeping image is performed by extracting first pixel content from the image at each pixel position in the first set of pixel positions and including said extracted first pixel content in the forward sweeping image;
using the second set of pixel positions to generate the backward sweeping image, wherein generating the backward sweeping image is performed by extracting second pixel content from the image at each pixel position in the second set of pixel positions and including said extracted second pixel content in the backward sweeping image;
performing a vertical alignment operation to vertically align the backward sweeping image with the forward sweeping image;
performing a horizontal alignment operation to horizontally align the backward sweeping image with the forward sweeping image; and
based on an offset that is determined as a result of performing the horizontal alignment operation, calibrating the MEMS system.

\* \* \* \* \*